(12) United States Patent
Thorsbakken et al.

(10) Patent No.: US 7,054,978 B1
(45) Date of Patent: May 30, 2006

(54) LOGICAL PCI BUS

(75) Inventors: Lloyd E. Thorsbakken, Blaine, MN (US); Larry L. Byers, Apple Valley, MN (US); Michael R. Overley, Maple Grove, MN (US)

(73) Assignee: Unisys Corporation, Blue Bell, PA (US)

( * ) Notice: Subject to any disclaimer, the term of this patent is extended or adjusted under 35 U.S.C. 154(b) by 443 days.

(21) Appl. No.: 09/931,710

(22) Filed: Aug. 16, 2001

(51) Int. Cl.
*G06F 13/14* (2006.01)
(52) U.S. Cl. ...................... 710/305; 710/312
(58) Field of Classification Search ............... 710/306, 710/307, 312
See application file for complete search history.

(56) References Cited

U.S. PATENT DOCUMENTS

| | | | | |
|---|---|---|---|---|
| 5,881,294 A | * | 3/1999 | Downey et al. ............ 710/260 |
| 5,936,953 A | * | 8/1999 | Simmons .................... 370/364 |
| 6,047,348 A | * | 4/2000 | Lentz et al. ................ 710/307 |
| 6,192,439 B1 | * | 2/2001 | Grunewald et al. ......... 710/260 |
| 6,311,245 B1 | * | 10/2001 | Klein ......................... 710/306 |
| 6,330,630 B1 | * | 12/2001 | Bell ............................ 710/312 |
| 6,393,500 B1 | * | 5/2002 | Thekkath .................... 710/35 |

* cited by examiner

*Primary Examiner*—Tim Vo
*Assistant Examiner*—Clifford Knoll
(74) *Attorney, Agent, or Firm*—Charles A. Johnson; Mark T. Starr; Nawrocki, Rooney & Sivertson, P.A.

(57) ABSTRACT

A method of and apparatus for improving the efficiency of a data processing system employing multiple busses operating at multiple data transfer rates. Each of the multiple physical busses has its own characteristics including maximum data transfer rate, parallel word width, etc. Two or more of these physical busses are combined into a single logical bus, wherein the single logical bus has characteristics resulting from the combination of physical busses. These characteristics can include greater parallel word widths, enhanced maximum data transfer rates, etc.

20 Claims, 7 Drawing Sheets

LOGICAL PCI BUS

CROSS REFERENCE TO CO-PENDING APPLICATIONS

The present application is related to co-pending U.S. patent application Ser. No. 09/651,488 filed Aug. 30, 2000, entitled Method for Managing Flushes with the Cache, assigned to the assignee of the present invention and incorporated herein by reference.

BACKGROUND OF THE INVENTION

1. Field of the Invention

The present invention relates generally to data processing systems employing bussed architectures and more particularly relates to such systems having multiple memory busses.

2. Description of the Prior Art

It is known in the art that busses reduce the number of components over straight point-to-point interconnections, because various components are time shared. However, as a result of this time sharing, the transfer speed of the bus becomes significant as a potential limiting factor with regard to system performance.

The factors involved in high performance bus designs are primarily related to the basic physics of electronic information transfer. Most especially these include bus length, power dissipation, distributed capacitance, number of bus connections, various "tuning" characteristics, etc.

Oftentimes, these factors act at cross purposes. For example, increased spacing of bussed components decreases performance. In compensation therefore, greater transfer energies can be utilized. However, such increased transfer energy generates more heat which needs to be dissipated. A primary method of increasing heat dissipation capacity is through the increase of bus component spacing. Those of skill in the art will readily appreciate many other interrelationships of the various design factors.

Quite often larger scale systems benefit from architectures having multiple busses. This is particularly the case for systems having multiple instruction processors, multiple input/output processors, and multiple component hierarchical memory structures.

Because of the disparate natures of these different system components, the associated bussing designs have differing characteristics. For example, the various busses may have different transfer rates, different widths (i.e., number of independent bit positions), different control protocols, etc. As a result, optimization of multiple busses within a given system tends to be extremely difficult.

SUMMARY OF THE INVENTION

The present invention overcomes the problems found in the prior art by providing a method of and apparatus for combining a plurality of individual lower speed busses to produce a single higher speed bus. This is accomplished through the use of the concept of "logical bus" wherein a given logical bus may be implemented using one or more physical busses.

In accordance with the preferred mode of practicing the present invention, the circuitry, called "Fast PCI Bridge Logic" is contained within a Direct I/O Bridge Extended (DBX) ASIC, which is installed on a printed circuit board assembly (PCA) that is in a Fast PCI Bridge module. The Fast PCI Bridge module provides three logical Peripheral Component Interconnect (PCI) Bus Interfaces to three SubDIB modules. Each SubDIB contains one logical PCI bus. Each PCI bus provides four card slot connections for PCI add-in cards.

The DBX ASIC contains all the necessary hardware to perform the bridge function between the Memory Input/Output (MIO) Bus and the PCI agents, an Input/Output Advanced Programmable Interrupt Controller (APIC) logic, PCI configuration Space, and Host generated PCI operations.

Each PCI Bus appears as an independent bridge to the software with its own configuration space. Each PCI Bus runs independent of the other PCI busses with separate arbitration logic.

The DBX ASIC also contains a single set of Interrupt handling logic (I/O APIC) that cover all three PCI Busses and one set of compatibility logic interrupts. There are four interrupt pins per PCI bus and 11 interrupt pins for the compatibility logic (24 pins). The I/O APIC logic has its own configuration space and shall be software compatible with the Intel Advanced Programmable Interrupt Controller like the 82489DX.

The fast PCI bridge module is connected to the system via the MIO bus, a point to point interface, to the POD. The MIO bus is a 100 MHz synchronous control interface (ions cycle) with a source synchronous data interface that transfers 64 bits of data at 200 MHz (two 64 bit data words every ions).

The DBX ASIC provides five physical 64 bit PCI bus interfaces, one 33 MHz bus and four 66 MHz busses. The 33 MHz PCI bus supports four PCI add-in cards. Each logical 66 MHz Pci bus supports four PCI add-in cards using two 33 MHz physical busses, with each physical bus supporting two PCI add-in cards. To accomplish connectivity of four add-in cards per 66 MHz bus and satisfy electrical integrity, stability and bus propagation time at 66 MHz, two physical busses with two PCI add-in cards each are required.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
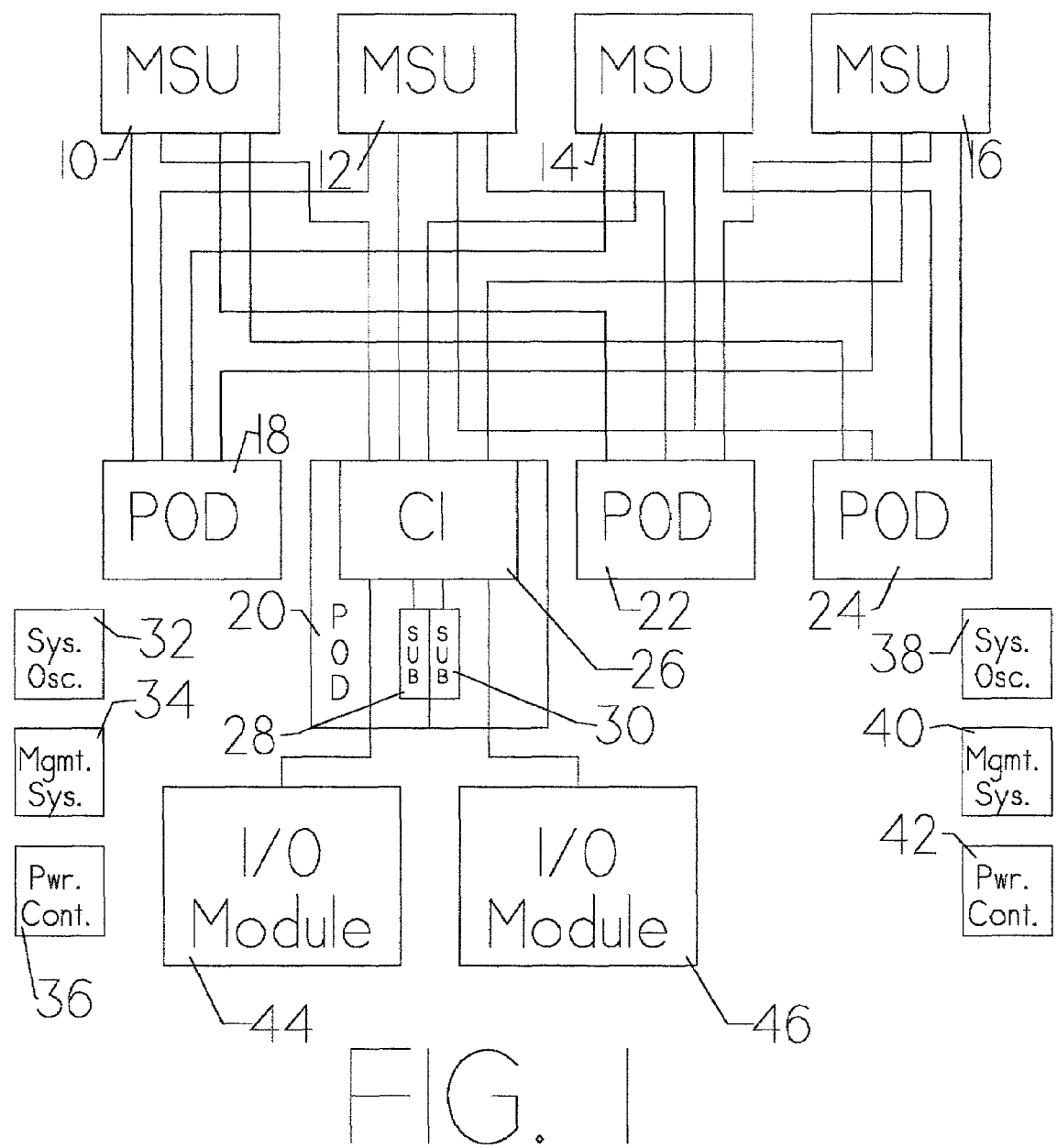
FIG. 1 is an overall block diagram of a fully populated system in accordance with the present invention.

FIG. 1 is an overall block diagram of fully populated data processing system according to the preferred mode of the present invention. This corresponds to the architecture of a commercial system of Unisys Corporation termed "Voyager".

The main memory of the system consists of up to four memory storage units, MSU 10, MSU 12, MSU 14, and MSU 16. Being fully modular, each of these four memory storage units is "stand-alone" and independent of one another. Each has a separate point-to-point dedicated bi-directional interface with up to four "pods", POD 18, POD 20, POD 22, POD 24. Again, each of the up to four pods is separate and independent of one another.

The contents of POD 20 are shown by way of example. For the fully populated system, POD 18, POD 22, and POD 24 are identical to POD 20. The interface between POD 20 and each of the four memory storage units (i.e., MSU 10, MSU 12, MSU 14, and MSU 16), is via a third level cache memory designated cached interface, CI 26, in this view. CI 26 couples with two input/output controllers, I/O Module 44 and I/O Module 46, and two sub-pods, SUB 28 and SUB 30. A more detailed explanation of the POD 20 is provided below.

The above described components are the major data handling elements of the system. In the fully populated system shown, there are sufficient components of each type, such that no single hardware failure will render the complete system inoperative. The software employed within the preferred mode of the present system utilizes these multiple components to provide enhanced reliability for long term operation.

The remaining system components are utilitarian rather than data handling. System Oscillator 32 is the primary system time and clocking standard. Management System 34 controls system testing, maintenance, and configuration. Power Controller 36 provides the required electrical power. System Oscillator 38, Management System 40, and Power Controller 42 provide completely redundant backup capability.

Figure 2:
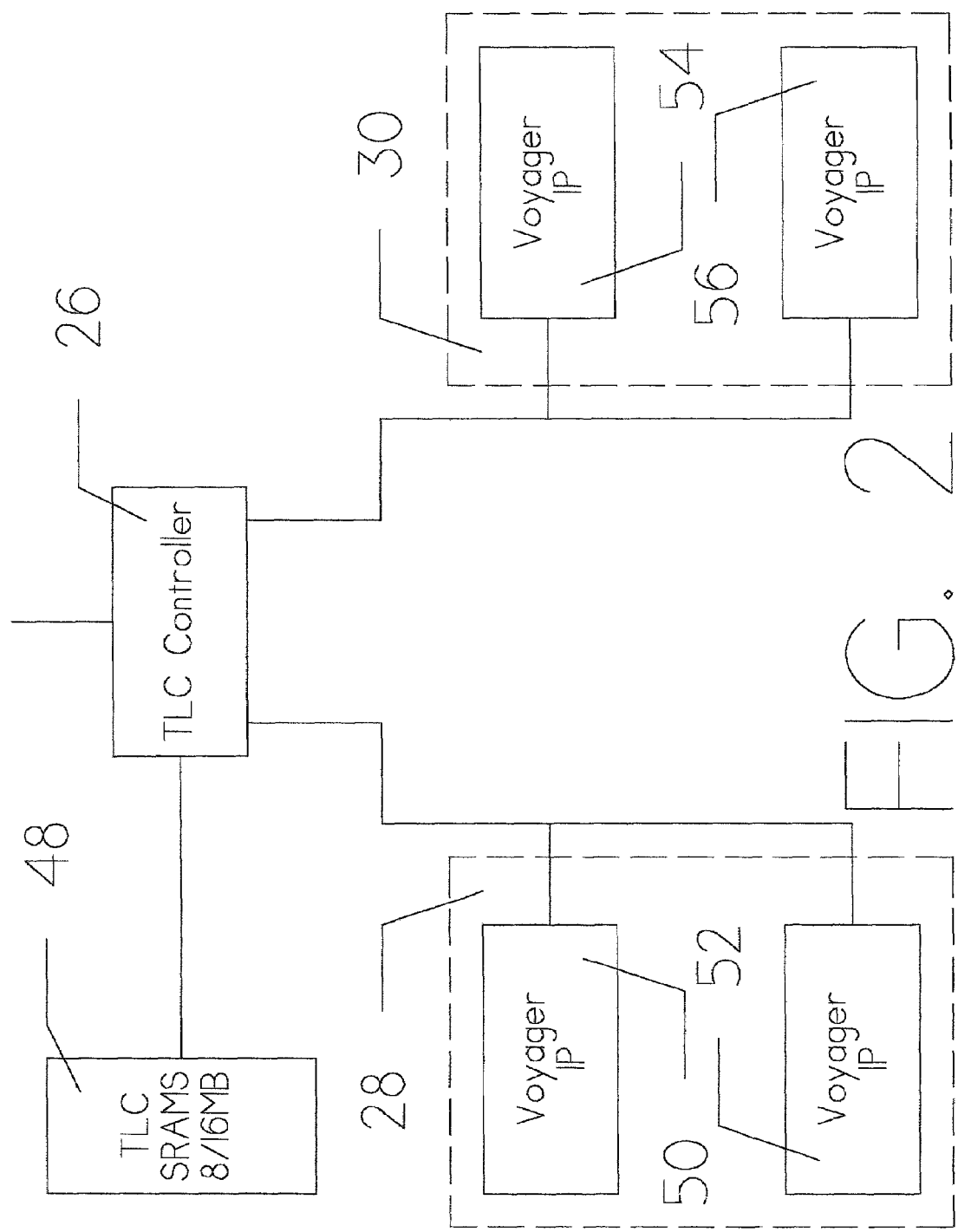
FIG. 2 is a schematic block diagram of one pod.

FIG. 2 is a more detailed block diagram of POD 20. The level three cache memory interfaces directly with the memory storage units via TLC Controller 26 (see also FIG. 1). The actual storage for the level three cache memory is TLC SRAMS 48. As indicated this static random access memory consists of eight 16 byte memory chips.

Subpod 28 and subpod 30 each contain up to two individual instruction processors. These are designated Voyager IP 50, Voyager IP 52, Voyager IP 54, and Voyager IP 56. As explained in detail below, each contains its own system controller. In accordance with the preferred mode of the present invention, these instruction processors need not all contain an identical software architecture.

Figure 3:
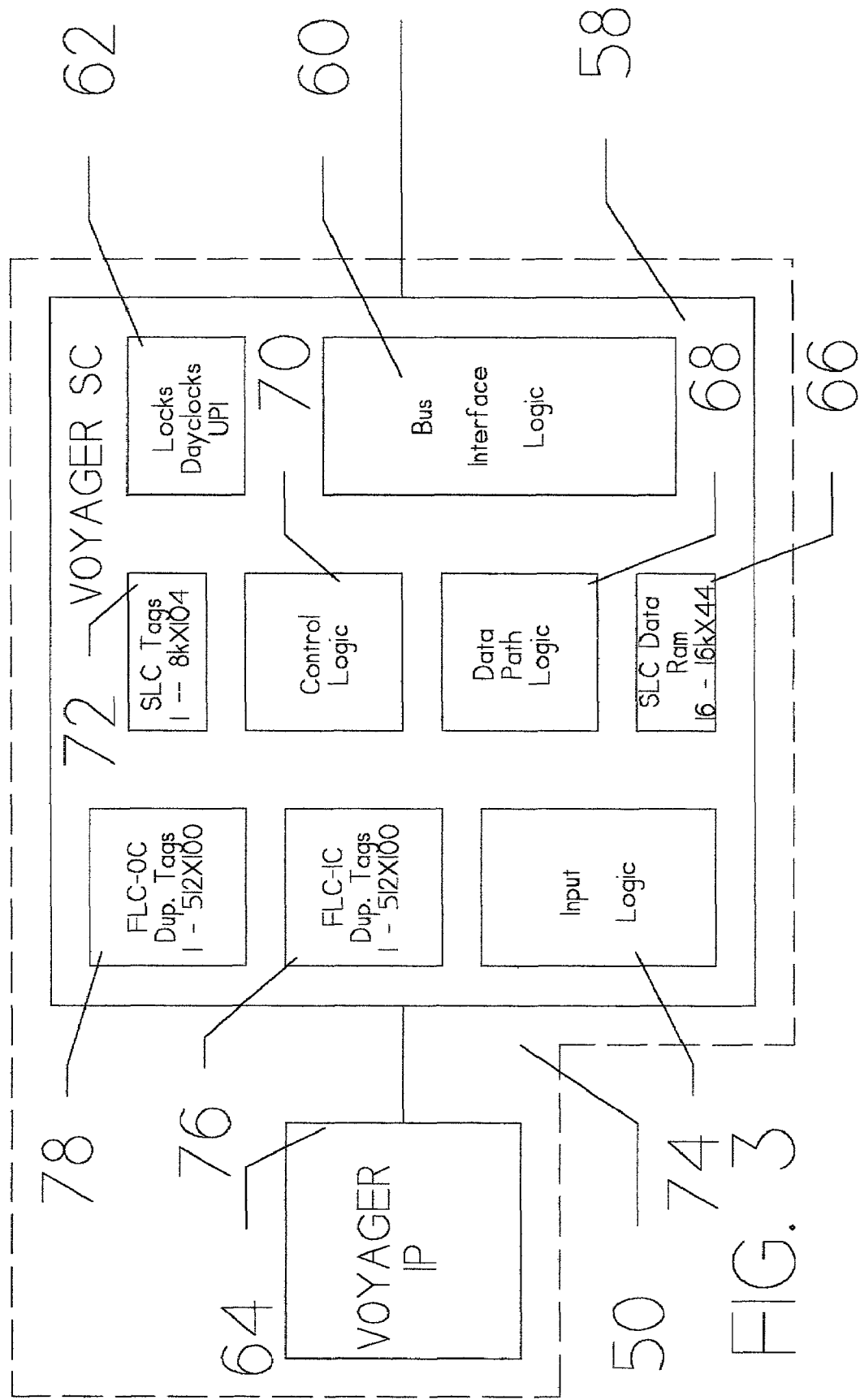
FIG. 3 is a schematic block diagram of one instruction processor along with its dedicated system controller.

FIG. 3 is a more detailed block diagram of Voyager IP 50, located within Subpod 28, located within POD 20 (see also FIGS. 1 and 2). As explained above, each instruction processor has a dedicated system controller having a dedicated level two cache memory. Instruction processor 64 has two dedicated level one cache memories (not shown in this view). One level one cache memory is a read-only memory for program instruction storage. Instruction processor 64 executes its instructions from this level one cache memory. The other level one cache memory (also not shown in this view) is a read/write memory for operand storage.

Instruction processor 64 is coupled via its two level one cache memories and dedicated system controller 58 to the remainder of the system. System controller 58 contains input logic 74 to interface with instruction processor 64. In addition, data path logic 70 controls movement of the data through system controller 58. The utilitarian functions are provided by Locks, Dayclocks, and UPI 62.

The remaining elements of system controller 58 provide the level two cache memory functions. SLC data ram 66 is the data actual storage facility. Control logic 70 provides the cache management function. SLC tags 72 are the tags associated with the level two cache memory. FLC-IC Dup. Tags 76 provides the duplicate tags for the level one instruction cache memory of instruction processor 64. Similarly, FLC-OC Dup. Tags 78 provides the duplicate tags for the level one operand cache memory of instruction processor 64. For a more complete discusses of this duplicate tag approach, reference may be made with the above identified co-pending and incorporated U.S. patent applications.

Figure 4:
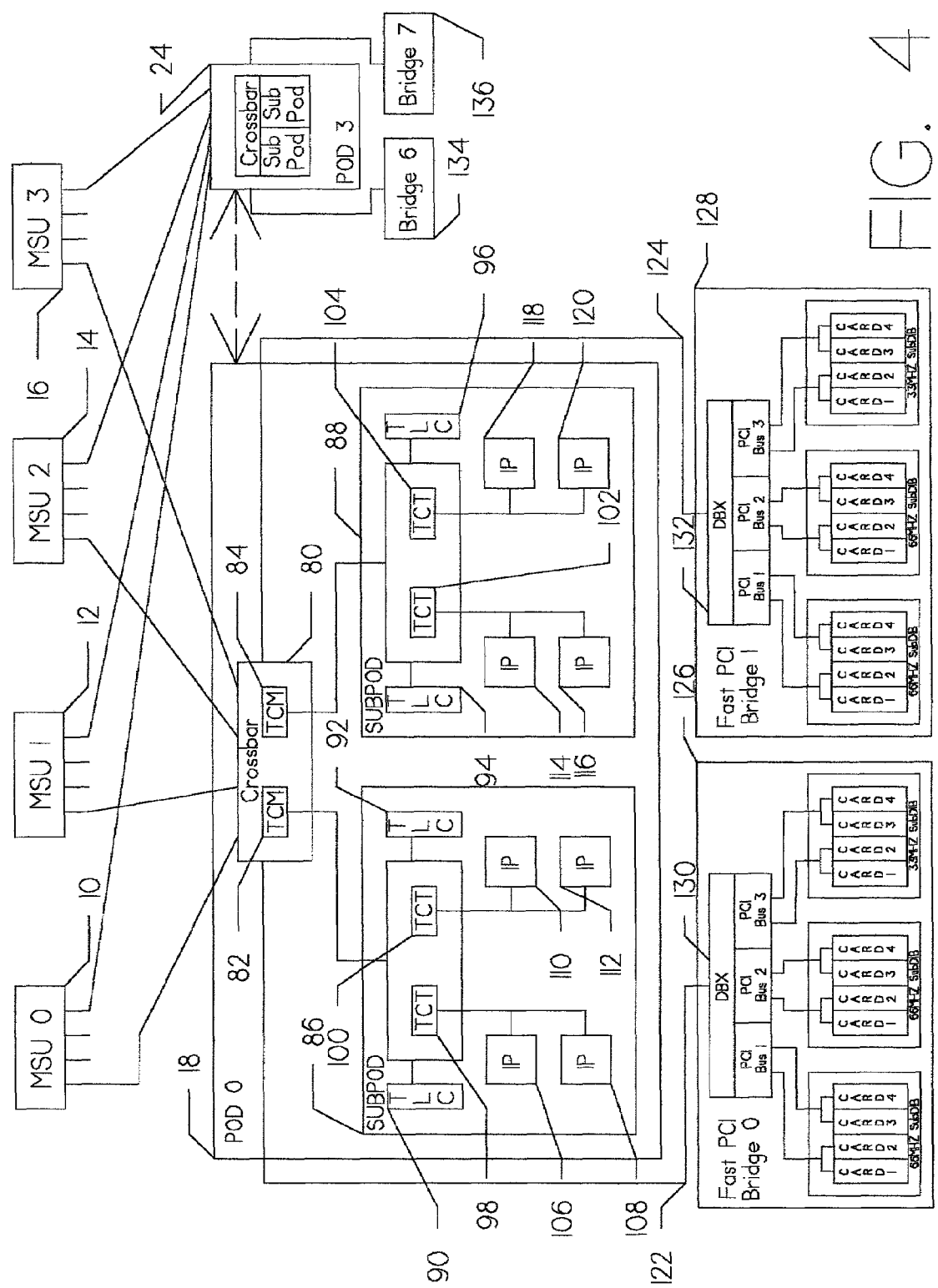
FIG. 4 is a detailed diagram of the system showing primary data paths involved in the preferred mode of the present invention.

FIG. 4 is a detailed functional diagram showing the primary data paths of the preferred mode of the present invention. Emphasized is the construction of POD0 18 which is shown in detail. The remaining POD's are similar.

Interface from POD0 18 to MSU0 10, MSU1 12, MSU2 14, and MSU3 16 is via crossbar switch 80, which contains cache memories 82 and 84 related to Subpod 86 (along with fast PCI bridge 0 126) and Subpod 88 (along with fast PCI bridge 1 128), respectively. Subpod 86 contains instruction processors 106, 108, 110, and 112 serviced by caches 98 and 100 along with SRAM's 90 and 92, whereas Subpod 88 contains instruction processors 114, 116, 118, and 120 serviced by caches 102 and 104 along with SRAM's 94 and 96.

The input/output section, employing the preferred mode of the present invention, consists of fast PCI bridge 0 126 and fast PCI bridge 1 128. Memory access is via crossbar 80, as shown. Direct I/O Bridge Extended (DBX) ASIC 130 is the heart of fast PCI bridge 126 and DBX ASIC 132 is the heart of fast PCI bridge 128. Each DBX ASIC (i.e., 130 and 132) is coupled to up to 12 individual cards via three dual PCI busses, as shown. These are discussed in further detail below.

POD3 24 is similar to POD0 18 but is shown in much less detail for clarity. It supports Bridge6 134 and Bridge7 136, as shown.

Figure 5:
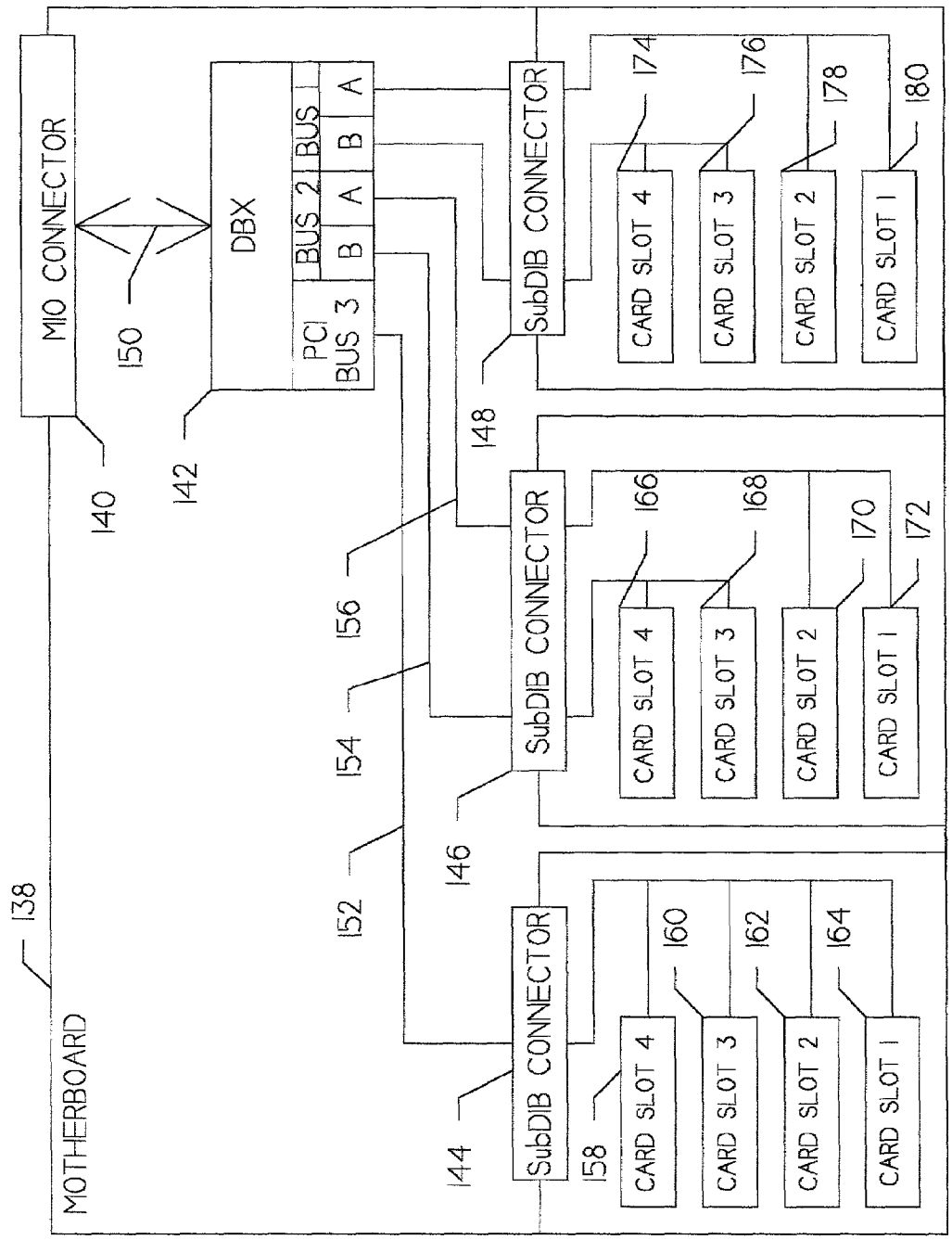
FIG. 5 is a detailed diagram showing the distinction between physical and logical busses.

FIG. 5 is detailed diagram showing the basic layout of Motherboard 138 of DBX ASIC 130. It is coupled to the remainder of the system via Memory Input/Output Connector 140 (See also FIG. 4). Internal memory input/output bus 150 has a basic data rate of 100 MHz transfers of parallel words providing a 1.6 gigabyte transfer rate.

Internal memory input/output bas 150 couples directly to Direct I/O Bridge Extended ASIC 142, which provides protocol conversion of multiplexing for the possible 12 input/output cards supportable by Motherboard 138. These functions are produced by PCI Busses 1, 2, and 3, as shown. PCI busses 1 and 2 are each divided into an A Bus and a B Bus. Each of these four busses can support 33 MHz or 66 MHz transfers rates, as discussed below in greater detail. PCI bus 2, for example has an A Bus 156 and a B Bus 154. PCI Bus 3 is a single bus only supporting 33 MHz transfer rate.

Each of the PCI busses is coupled to a SubDIB connector (i.e., 148, 146, and 144, respectively), as shown. Each of these three SubDIB connector can support up to four input/output cards. SubDIB connector 48 supports card slots 180, 178, 176, and 174. Similarly, SubDIB connector 146 supports card slots 172, 170, 168, and 166, and SubDIB connector 144 supports card slots 164, 162, 160, and 158.

Figures 6A, 6B:
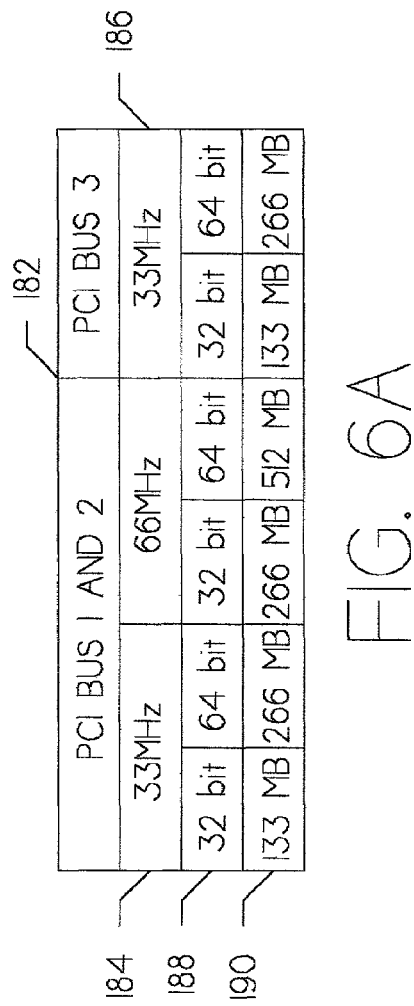
FIG. 6A is a table showing the maximum transfer rates of each of the busses.
FIG. 6B is a table showing the options available for handling the various add-on cards.

FIG. 6A is table 182 showing the total throughput capacities of each of the three PCI busses (See also FIG. 5). Row 184 specifies the basic word transfer rate, wherein PCI Busses can support either 33 MHz or 66 MHz transfer rates. Element 186 indicates that PCI Bus 3 can only support 33 MHz transfer rate.

Row 188 shows the word width wherein each bus can support either 32 bit or 64 bit word widths. Row 190 shows the resulting byte transfer rates for each combination of basic word transfer rate and word width.

FIG. 6B is a table 192 showing the mix of cards for each of the three PCI busses (See also FIG. 5). PCI Bus 1, for example, can support up to four cards of either 33 MHz or 66 MHz. PCI Bus 2 has a similar capacity. PCI Bus 3, on the other hand, can support four cards of only 33 MHz. Column 194 shows the total number of cards supportable by the entire motherboard. The three possible combinations are: 12 33 MHz cards; eight 33 MHz cards and four 66 MHz cards; and four 33 MHz cards and eight 66 MHz cards.

Figure 7:
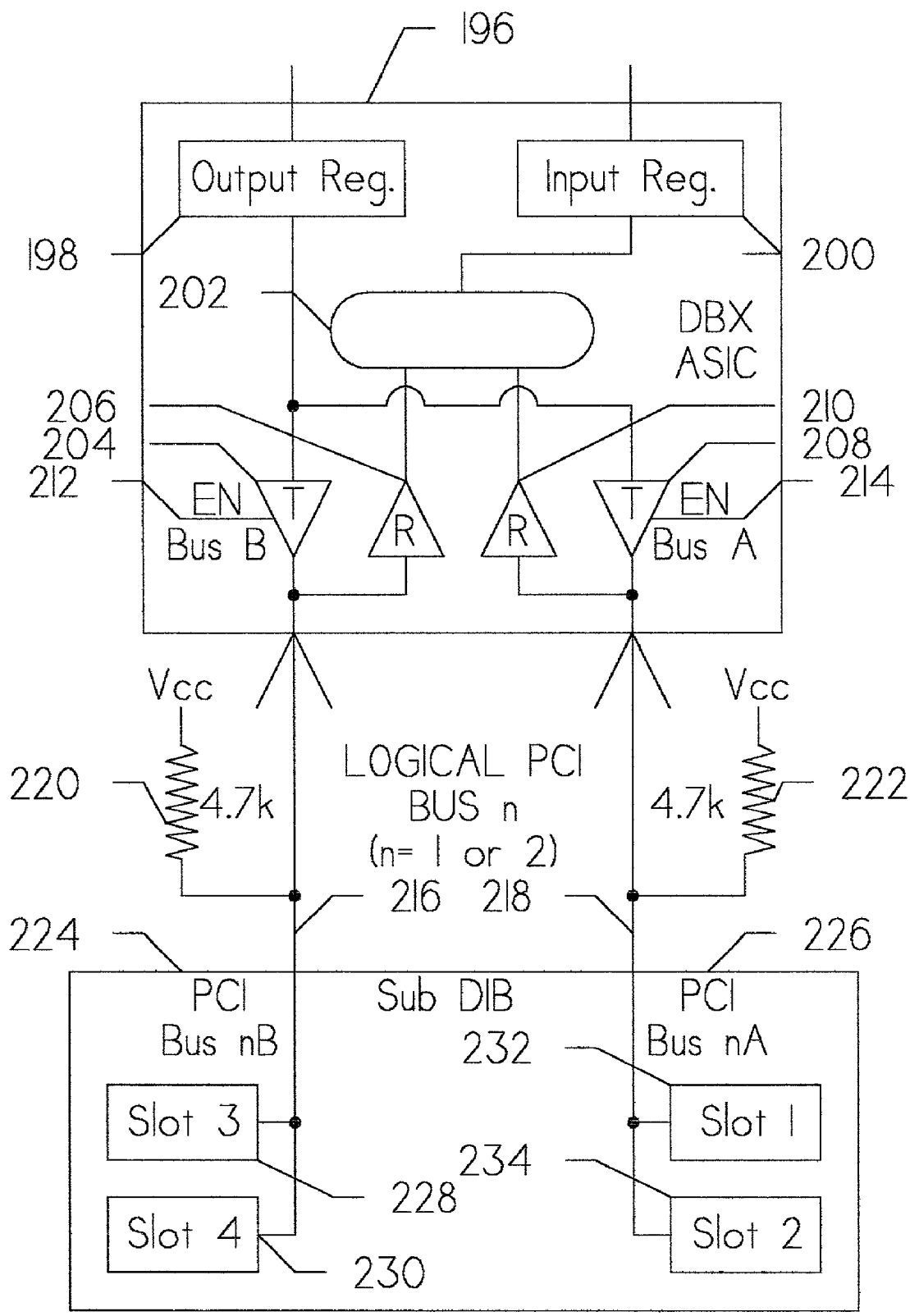
FIG. 7 is detailed diagram showing the preferred mode of the present invention.

FIG. 7 is a detailed schematic diagram showing how physical busses are configured as logical busses. Logical DBX ASIC 196 has logical input register 200 and logical output register 198, which correspond to the associated physical components (See also FIG. 5).

Selector 202 permits selection of either receiver 206 coupled to Bus B 216 or receiver 210 coupled to Bus A 218 for transfer to logical input register 200. In effect, selector 202 can thus simulate a 66 MHz transfer rate from two inputs (i.e., receiver 206 and receiver 210) each operating at 33 MHz.

Similarly, transmitters 204 and 208 are alternately enabled by enables 212 and 214 to receive 66 MHz data transfers as two 33 MHz inputs. Pull-up resistors 220 and 222 provide for rapid coupling of Bus A 218 and Bus A 216 to logical halves 226 and 224, respectfully, of the SubDIB. Logical half 226 contains logical card slots 232 and 234, whereas logical half 224 contains card slots 228 and 230.

Having thus described the preferred embodiments in sufficient detail for those of skill in the art to make and use the present invention, those of skill in the art will be readily able to apply the teachings found herein to yet other embodiments within the scope of the claims hereto attached.

The invention claimed is:

1. In a data processing system having a first component and a second component, the improvement comprising:
   a. A first data bus having a first set of characteristics responsively coupled between said first component via a first interface and said second component via a second interface;
   b. A second data bus having a second set of characteristics responsively coupled between said first component via a third interface and said second component via a fourth interface; and
   c. A circuit responsively coupled to said first data bus and said second data bus having a single set of interrupt handling logic which handles interrupts from both said first data bus and said second data bus and a selector which can couple said first data bus to said third interface and said second interface and which can couple said second data bus to said first interface and said second interface for alternately selecting transfers from said first data bus and said second data bus which combines said first data bus and said second data bus into a logical bus having a third set of characteristics wherein said third set of characteristics is different from either said first set of characteristics and said second set of characteristics.

2. A data processing system according to claim 1 wherein said first set of characteristics includes a first maximum transfer rate, said second set of characteristics includes a second maximum transfer rate, and said third set of characteristics includes a third maximum transfer rate and wherein said third maximum transfer rate is greater than either of said first maximum transfer rate and said second maximum transfer rate.

3. A data processing system according to claim 2 wherein said third maximum transfer rate is the sum of said first maximum transfer rate and said second maximum transfer rate.

4. A data processing system according to claim 3 wherein said first maximum transfer rate and said second maximum transfer rate are equal.

5. A data processing system according to claim 4 wherein said first maximum transfer rate is equal to 66 MHZ.

6. A data processing system comprising:
   a. A first component;
   b. A second component;
   c. A first data bus responsively coupled between said first component via a first interface and said second component via a second interface;
   d. A second data bus responsively coupled between said first component via a third interface and said second component via a fourth interface; and
   e. A circuit responsively coupled to said first data bus and said second data bus having a selector for alternately selecting transfers from said first data bus and said second data bus which switches said first data bus between said first interface and said third interface and between said second interface and said fourth interface and said second data bus into a logical bus.

7. A data processing system according to claim 6 wherein said first data bus has a first set of characteristics, said second data bus has a second set of characteristics, said logical bus has a third set of characteristics, and said third set of characteristics if different from said first set of characteristics and said second set of characteristics.

8. A data processing system according to claim 7 wherein said first set of characteristics includes a first data transfer rate, said second set of characteristics includes a second data transfer rate, said third set of characteristics includes a third data transfer rate, and said third data transfer rate is greater than either of said first data transfer rate and said second data transfer rate.

9. A data processing system according to claim 8 wherein said third data transfer rate equals the sum of said first data transfer rate and said second data transfer rate.

10. A data processing system according to claim 9 wherein said first data transfer rate is equal to said second data transfer rate.

11. A method of coupling a first component to a second component within a data processing system comprising:
    a. Providing a first data bus having a first set of characteristics responsively coupled between said first component via a first interface and said second component via a second interface;
    b. Providing a second data bus having a second set of characteristics responsively coupled between said first component via a third interface and said second component via a fourth interface; and
    c. Alternating transfers from said first data bus and said second data bus using a single set of interrupt handling logic to handle interrupts from said first data bus and said second data bus to produce a logical bus having a third set of characteristics by switching said first data bus between said first interface and said third interface and between said second interface and said fourth interface.

12. A method according to claim 11 wherein said first set of characteristics includes a first data transfer rate, said second set of characteristics includes a second data transfer rate, said third set of characteristics includes a third data transfer rate, and said third data transfer rate is greater than either of said first data transfer rate and said second data transfer rate.

13. A method according to claim 12 wherein said third data transfer rate is equal to the sum of said first data transfer rate and said second data transfer rate.

14. A method according to claim 13 wherein said first data transfer rate is equal to said second data transfer rate.

15. A method according to claim 14 wherein said first data transfer rate is equal to 66 MHZ.

16. An apparatus comprising:
   a. First performing means for performing a first data processing function;
   b. Second performing means for performing a second data processing function;
   c. First transferring means responsively coupled to said first performing means and said second performing means for transferring data from said first performing means to said second performing means in accordance with a first set of characteristics;
   d. Second transferring means responsively coupled to said first performing means and said second performing means for transferring data from said first performing means to said second performing means in accordance with a second set of characteristics; and
   e. Alternating means responsively coupled to said first transferring means and said second transferring means for alternating transfers from said first transferring means and said second transferring means to provide a logical transferring means having a third set of characteristics having a single set of interrupt handling logic and a selector for multiplexing transfers from said first data bus and said second data bus.

17. An apparatus according to claim 16 wherein said first set of characteristics includes a first transfer rate, said second set of characteristics includes a second transfer rate, said third set of characteristics includes a third transfer rate, and said third transfer rate is greater than either of said first transfer rate and said second transfer rate.

18. An apparatus according to claim 17 wherein said third transfer rate equals the sum of said first transfer rate and said second transfer rate.

19. An apparatus according to claim 18 wherein said first transfer rate equals said second transfer rate.

20. An apparatus according to claim wherein said first transfer rate is equal to 66 MHz.

* * * * *